United States Patent
Modeki

(10) Patent No.: US 9,871,238 B2
(45) Date of Patent: Jan. 16, 2018

(54) SECONDARY BATTERY

(71) Applicant: NEC ENERGY DEVICES, LTD., Sagamihara-shi, Kanagawa (JP)

(72) Inventor: Akihiro Modeki, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 15/023,091

(22) PCT Filed: Aug. 27, 2014

(86) PCT No.: PCT/JP2014/072384
§ 371 (c)(1),
(2) Date: Mar. 18, 2016

(87) PCT Pub. No.: WO2015/041017
PCT Pub. Date: Mar. 26, 2015

(65) Prior Publication Data
US 2016/0233472 A1    Aug. 11, 2016

(30) Foreign Application Priority Data

Sep. 20, 2013 (JP) .................................. 2013-195368

(51) Int. Cl.
*H01M 6/50* (2006.01)
*H01M 2/14* (2006.01)
*H01M 2/02* (2006.01)

(52) U.S. Cl.
CPC .......... *H01M 2/14* (2013.01); *H01M 2/0267* (2013.01); *H01M 2/0287* (2013.01); *H01M 2200/00* (2013.01); *H01M 2220/20* (2013.01)

(58) Field of Classification Search
CPC ...................................................... H01M 6/50
See application file for complete search history.

(56) References Cited

U.S. PATENT DOCUMENTS

2006/0093906 A1* 5/2006 Yamashita .............. B32B 15/08
429/176
2011/0052964 A1* 3/2011 Kim .................... H01M 2/1673
429/152

FOREIGN PATENT DOCUMENTS

| JP | 8-264206 A | 10/1996 |
|---|---|---|
| JP | 10-308198 A | 11/1998 |
| JP | 2000-21386 A | 1/2000 |
| JP | 2002-151159 A | 5/2002 |

(Continued)

OTHER PUBLICATIONS

International Search Report for PCT/JP2014/072384 dated Nov. 11, 2014 [PCT/ISA/210].

(Continued)

*Primary Examiner* — Jacob Marks
(74) *Attorney, Agent, or Firm* — Sughrue Mion, PLLC

(57) ABSTRACT

To provide a secondary battery that can be prevented from exploding or catching fire due to the occurrence of a short circuit. The secondary battery (10) of the present invention includes an electric cell assembly that is, at least, partially enclosed by an extensible sheet (11) having a surface resistivity of $10^{-2}$ Ω/sq to $10^{10}$ Ω/sq, and is housed together with an electrolyte in a container (5), and in which positive electrodes (1) and negative electrodes (2) are stacked on each other or wound with a separator (3) interposed therebetween.

4 Claims, 1 Drawing Sheet

(56) References Cited

FOREIGN PATENT DOCUMENTS

JP     2003-257496 A    9/2003
WO     2013/027296 A1   2/2013

OTHER PUBLICATIONS

Written Opinion for PCT/JP2014/072384 dated Nov. 11, 2014 [PCT/ISA/237].

* cited by examiner

[FIG. 1]
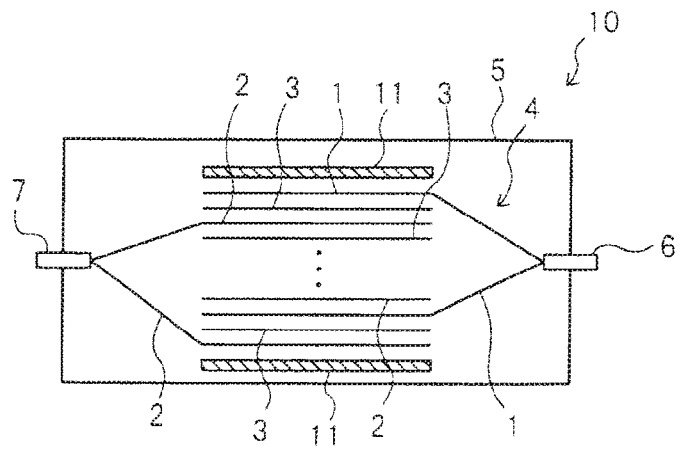
[FIG. 2]
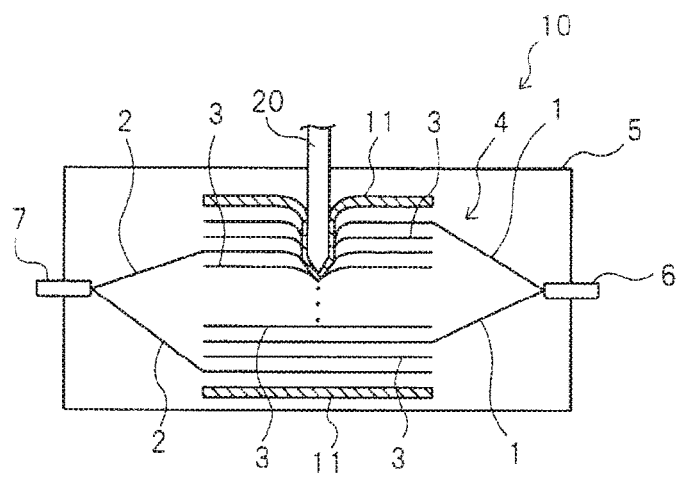
[FIG. 3]
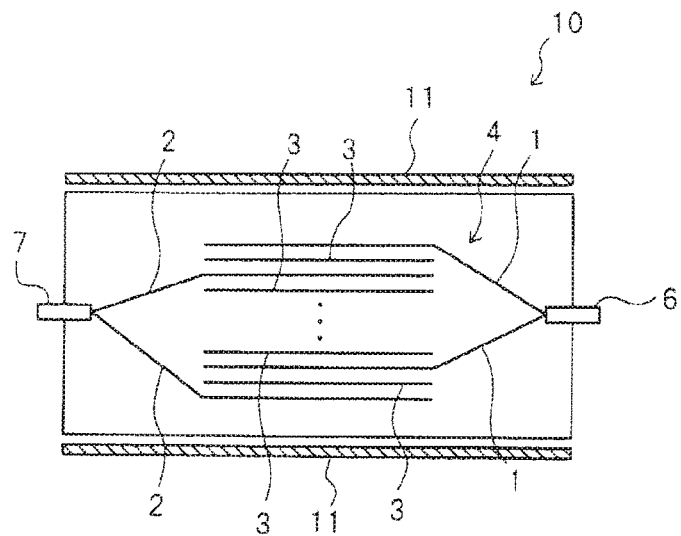

SECONDARY BATTERY

CROSS REFERENCE TO RELATED APPLICATIONS

This application is a National Stage of International Application No. PCT/JP2014/072384, filed on Aug. 27, 2014, which claims priority from Japanese Patent Application No. 2013-195368, filed on Sep. 20, 2013, the contents of all of which are incorporated herein by reference in their entirety.

TECHNICAL FIELD

The present invention relates to a rechargeable and dischargeable secondary battery.

BACKGROUND ART

Rechargeable and dischargeable secondary batteries have been used for hybrid cars, electric vehicles, electric assist bicycles and others.

A secondary battery is formed by inserting and sealing an electric cell assembly and electrolyte in a container, and the electric cell assembly has positive electrodes and negative electrodes which are stacked on each other with separators of polyethylene, polypropylene, or the like interposed therebetween.

In the case of the secondary battery constructed as above, if, for example, a sharp metal object such as a nail etc., penetrates the container, the positive and negative electrodes may be short-circuited so that an excessive amount of current flows and the battery generates heat which leads to the risk that the battery may explode or catch fire.

To solve this problem, as one example of the related art, Patent Document 1 discloses a method of preventing short-circuit between the positive electrode and the negative electrode if a metal object penetrates the battery container. Specifically, a high-polymer sheet having a coefficient of elongation 1% or greater is disposed on the external surface of the container, so that the high-polymer sheet can stretch along the sides of a metal object that has penetrated the interior of the container so as to cover the metal object. Therefore, the high-polymer sheet that has an extremely low electric conductivity is interposed between the positive and negative electrodes which makes it possible to prevent a short-circuit from occurring between the positive and negative electrodes, thus preventing the battery from exploding or catching fire.

RELATED ART DOCUMENTS

Patent Documents

Patent Document 1: JP2002-151159A

SUMMARY OF THE INVENTION

Problems to be Solved by the Invention

In the case of the above Patent Document 1, since a high-polymer sheet having a markedly low electrical conductivity is disposed on the external surface of the container, a short-circuit between the positive and negative electrodes, due to a metal object coming into contact with both electrodes, is prevented when the metal object penetrates the container. However, the electric cell assembly formed of positive and negative electrodes is in a state in which energy has been accumulated and stored. As a result, if the high-polymer sheet tears for any reason, a short-circuit will occur between the positive and negative electrodes via the metal object that is in contact with both electrodes, thus immediately causing an excessive flow of current which causes heat generation within the battery and thereby creates the risk that the battery will explode or catch fire.

The object of the present invention is to provide a secondary battery that can solve the problems in which there is a risk that the battery will explode or catch fire when a metal object penetrates the interior of the container.

Means for Solving the Problems

A secondary battery of the present invention includes an electric cell assembly that is, at least, partially enclosed by an extensible sheet having a surface resistivity of $10^{-2}$ $\Omega$/sq to $10^{10}$ $\Omega$/sq, and that is housed together with an electrolyte in a container, and in which positive electrodes and negative electrodes are stacked on each other or wound with a separator interposed therebetween.

Effect of the Invention

According to the present invention, since the energy stored in the electric cell assembly is released gradually, it is possible to prevent a secondary battery from exploding or catching fire.

BRIEF DESCRIPTION OF THE DRAWINGS

FIG. 1 A schematic sectional diagram of one exemplary embodiment of a secondary battery according to the present invention.

FIG. 2 A schematic diagram showing a state where a metal object has penetrated the interior of the secondary battery of the present invention.

FIG. 3 A schematic sectional diagram of another exemplary embodiment of a secondary battery according to the present invention.

EXEMPLARY EMBODIMENT OF THE INVENTION

The details of exemplary embodiment of the present invention will be described with reference to the accompanying drawings. Here, components that have the same functions are allotted with the same numbers in the accompanying drawings, and description of those may be omitted.

FIG. 1 is a schematic configurational diagram of one exemplary embodiment of a secondary battery according to the present invention. FIG. 1 shows a secondary battery including an electric cell assembly having positive electrodes and negative electrodes stacked on each other with a separator interposed therebetween. However, the present invention should not be limited to this, but can also be applied to secondary batteries that include an electric cell assembly having a positive electrode and negative electrode wound with a separator interposed therebetween.

Positive electrodes 1 and negative electrode 2 are stacked on each other with separator 3 interposed therebetween, forming electric cell assembly 4. Electric cell assembly 4 is housed together with electrolyte in container 5. One end of positive electrode tab 6 is positioned inside container 5 and connected to each positive electrode 1 while the other end of positive electrode tab 6 is located outside container 5. Also, one end of negative electrode tab 7 is positioned inside container 5 and connected to each negative electrode 2 while the other end of negative electrode tab 7 is located outside container 5. In the present exemplary embodiment, positive electrode tab 6 and negative electrode tab 7 are arranged on two opposite sides of container 5. However, positive electrode tab 6 and negative electrode tab 7 may be disposed on the same side.

In secondary battery 10 of the present invention, extensible sheet 11 is arranged so as to cover electric cell assembly 4. Extensible sheet 11 in the present invention is characterized by having a surface resistivity of $10^{-2}$ Ω/sq to $10^{10}$ Ω/sq and a coefficient of elongation 10% or greater. Examples of extensible sheet 11 include polyurethane film and cellophane.

As shown in FIG. 2, when sharp-edged metal object 20 such as a nail or the like has penetrated the interior of container 5, extensible sheet 11, thanks to its stretchability properties, stretches along metal object 20 that has penetrated the interior of container 5 and can cover metal object 20. As a result, extensible sheet 11 resides between positive electrode 1 and negative electrode 2. Although a high-polymer sheet having a markedly low electric conductivity is used in Patent Document 1 that is cited as the related art, extensible sheet 11 of the present invention has a surface resistivity of $10^{-2}$ Ω/sq to $10^{10}$ Ω/sq. For example, an electrically conductive aluminum sheet having has a surface resistivity in the order of $10^{-3}$ Ω/sq. For example, an ordinary sheet of insulating antistatic film has a surface resistivity in the order of $10^{11}$ Ω/sq or greater. That is, the extensible sheet of the present invention, which differs from the high-polymer sheet of Patent Document 1, has low electrical conductivity such that only a small amount of electricity can flow. For this reason, when extensible sheet 11 comes into contact with positive electrode 1 and negative electrode 2, because metal object 20 penetrates the interior of the container, extensible sheet 11 creates a soft short-circuit which allows a small amount of short-circuit current to flow through extensible sheet 11, whereby the energy stored in electric cell assembly 4 is gradually released. Thus, energy stored in electric cell assembly 4 is slowly released, and hence it is possible to prevent the secondary battery from generating heat and this reduces the risk that the secondary battery will of explode or catch fire.

In the above exemplary embodiment, extensible sheet 11 is arranged between electric cell assembly 4 and the interior wall surface of container 5 so as to cover electric cell assembly 4. However, extensible sheet 11 may be arranged so as to cover the exterior of container 5, as shown in FIG. 3, for instance. Further, container 5 may be configured of a laminate film that is formed of a metal layer, such as aluminum foil, laminated on both sides with resin layers, at least one of which is formed of extensible sheet 11.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

This application claims priority based on Japanese Patent Application 2013-195368 filed on Sep. 20, 2013, and should incorporate herein all the disclosure thereof.

DESCRIPTION OF REFERENCE NUMERALS 1 positive electrode
2 negative electrode
3 separator
4 electric cell assembly
5 container
10 secondary battery
11 extensible sheet

The invention claimed is:

1. A secondary battery comprising an electric cell assembly that is, at least, partially enclosed by an extensible sheet having a surface resistivity of $10^{-2}$ Ω/sq to $10^{10}$ Ω/sq, and housed together with an electrolyte in a container, and in which positive electrodes and negative electrodes are stacked on each other or wound with a separator interposed therebetween, wherein the extensible sheet is positioned between the electric cell assembly and an interior wall surface of the container.

2. A secondary battery comprising an electric cell assembly that is, at least, partially enclosed by an extensible sheet having a surface resistivity of $10^{-2}$ Ω/sq to $10^{10}$ Ω/sq, and housed together with an electrolyte in a container, and in which positive electrodes and negative electrodes are stacked on each other or wound with a separator interposed therebetween, wherein the extensible sheet is disposed so as to cover an exterior of the container.

3. The secondary batter according to claim 1, wherein the coefficient of elongation of the extensible sheet is 10% or greater.

4. The secondary battery according to claim 2 wherein the coefficient of elongation of the extensible sheet is 10% or greater.

* * * * *